No. 768,257. PATENTED AUG. 23, 1904.
G. H. ADAMS.
APPARATUS FOR TREATING THE SOIL.
APPLICATION FILED MAY 26, 1904.
NO MODEL.

WITNESSES
INVENTOR
George H. Adams,
BY Franklin H. Hough
Attorney

No. 768,257. Patented August 23, 1904.

UNITED STATES PATENT OFFICE.

GEORGE H. ADAMS, OF PHŒNIX, ARIZONA TERRITORY.

APPARATUS FOR TREATING THE SOIL.

SPECIFICATION forming part of Letters Patent No. 768,257, dated August 23, 1904.

Application filed May 26, 1904. Serial No. 209,959. (No model.)

*To all whom it may concern:*

Be it known that I, GEORGE H. ADAMS, a citizen of the United States, residing at Phœnix, in the county of Maricopa, Arizona Territory, have invented certain new and useful Improvements in Apparatus for Treating the Soil; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in agricultural implements; and the object of the invention is to provide a machine having a series of circular metallic disks which are adapted to cut into the soil for the purpose of loosening and pulverizing the soil to greater depths than possible with a plow and without tearing up the ground, thereby affording a mechanism which may be used to tread ground that is planted and without in the least disturbing the roots of the plants.

My invention consists, further, in the provision of rotary disks, which may be of different diameters and interchangeably held to a suitable shaft, with means for raising the shaft or applying pressure thereto to cause the disks to cut but short distances or deep into the soil for the purpose of affording an opportunity for the roots of plants to reach down into the soil for subsistance, moisture, &c.

The invention consists, further, in the provision of an apparatus of the character described especially adapted for use in regions where farming is done by irrigation and embodying various details of construction and combinations of parts, as will be hereinafter more fully described and then specifically defined in the appended claims.

I illustrate my invention in the accompanying drawings, in which—

Figure 1:
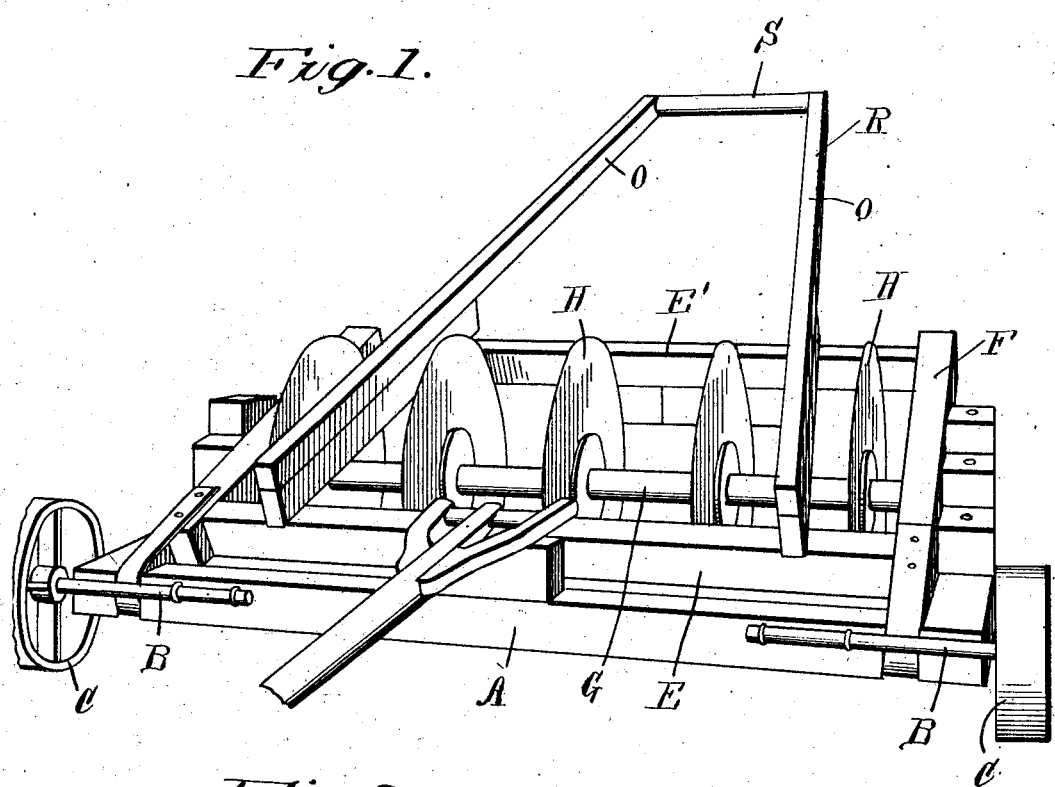
Figure 2:
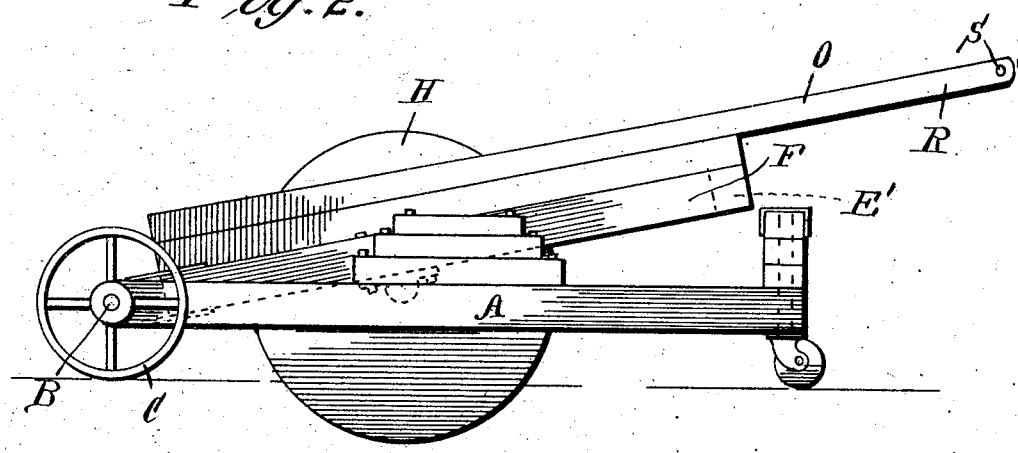

Figure 1 is a perspective view of my improved machine for treating the soil. Fig. 2 is a side elevation.

Reference now being had to the details of the drawings by letter, A designates a carriage, having a tongue secured thereto, and fastened to the forward portion of the carriage are two stub-shafts B B, on which wheels C C are journaled, and to the rear of the frame is a trailer-wheel, thereby making it possible to conveniently turn the carriage within a short radius. Pivotally connected with the cross-beam E of said carriage is a frame F, in the parallel side beams of which is journaled in suitable bearings a shaft G, upon which are mounted the disks H. These disks may be of any size and made so that they may be easily interchanged in order to provide means for cutting at different depths in the soil. A suitable handle R is provided, which may be of any suitable shape or size, and in the present instance I have shown the handle as being made of two converging beams O O, connected together at their rear ends with a cross-piece S. The forward ends of the beams O are fastened to the beam E of said frame and projecting rearward fulcrum over the rear beam E' of the frame, affording means whereby pressure may be applied to the rear portion thereof when it is desired to have the disks cut deep into the soil.

By the provision of the apparatus described and illustrated I have found by practice that I am able to cut and pulverize the soil at various depths without disturbing the growing plants and affording an opportunity for the roots to reach down deep in the soil to get the necessary moisture and nutriment so essential to their hearty growth and which is of vital importance in farming regions where irrigation is carried on.

While I have illustrated in the drawings a particular construction of apparatus as embodying my invention, it will be understood that I do not limit myself to the particular form of machine shown, as the same may be varied as to details of its construction without in any way departing from the spirit of the invention.

Having thus described my invention, what I claim to be new, and desire to secure by Letters Patent, is—

1. An apparatus for treating the soil, comprising a truck-frame, stub-shafts fixed to the front face of the cross-beam at the forward end of the truck, wheels journaled on said shafts, a disk-carrying rack, hinge straps secured to the forward end thereof and engaging recessed portions of the front cross-beam of said truck, a shaft journaled in said rack, circular disks fixed to said shaft, carried by said rack, beams fixed at their forward ends to the forward cross-piece of the rack, strips, secured to the under faces of said beams and designed to bear frictionally against the disk-carrying shaft, and a handle connecting the rear ends of said beams, as set forth.

2. An apparatus for treating the soil, comprising a truck-frame, stub-shafts fixed to the front face of the cross-beam at the forward end of the truck, wheels journaled on said shafts, a disk-carrying rack, hinge-straps secured to the forward end thereof and adapted to turn in recessed portions in the front cross-beam of said truck, a shaft journaled in said rack, circular disks fixed to said rack-carrying shaft, beams fixed, at their forward ends, to the forward cross-piece of the rack, strips secured to the under faces of said beams and designed to bear against said disk-carrying shaft, the rear portion of said truck having a raised portion beyond the rear ends of said strips, and a handle connecting the rear ends of said beams, as set forth.

In testimony whereof I hereunto affix my signature in presence of two witnesses.

GEORGE H. ADAMS.

Witnesses:
 N. W. CHASE,
 W. O. PAGE.